(12) United States Patent
Schneider et al.

(10) Patent No.: US 12,655,858 B2
(45) Date of Patent: Jun. 16, 2026

(54) INSERT PIECE FOR INSERTING INTO A CHANNEL SECTION OF AN ANGLED PIECE

(71) Applicant: NORMA GERMANY GMBH, Maintal (DE)

(72) Inventors: David Schneider, Darmstadt (DE); Daniel Kintea, Groß-Umstadt (DE); Hannes Clasen, Frankfurt am Main (DE); Stéphane Gaudin, Guichen (FR)

(73) Assignee: NORMA GERMANY GMBH, Maintal (DE)

( * ) Notice: Subject to any disclaimer, the term of this patent is extended or adjusted under 35 U.S.C. 154(b) by 14 days.

(21) Appl. No.: 18/693,595

(22) PCT Filed: Sep. 22, 2022

(86) PCT No.: PCT/EP2022/076373
§ 371 (c)(1),
(2) Date: Mar. 20, 2024

(87) PCT Pub. No.: WO2023/046832
PCT Pub. Date: Mar. 30, 2023

(65) Prior Publication Data
US 2024/0384734 A1 Nov. 21, 2024

(30) Foreign Application Priority Data
Sep. 22, 2021 (DE) ...................... 10 2021 124 551.6

(51) Int. Cl.
*F15D 1/04* (2006.01)
*F16L 43/00* (2006.01)
(52) U.S. Cl.
CPC ................ *F15D 1/04* (2013.01); *F16L 43/00* (2013.01)

(58) Field of Classification Search
CPC ... F15D 1/04; F16L 43/00; F16L 55/07; F16L 55/02
See application file for complete search history.

(56) References Cited

U.S. PATENT DOCUMENTS

| | | | | |
|---|---|---|---|---|
| 2,273,818 A | * | 2/1942 | Childers | ............... F24F 13/081 110/184 |
| 2,667,185 A | * | 1/1954 | Beavers | ................ F24F 13/081 454/333 |

(Continued)

FOREIGN PATENT DOCUMENTS

| | | |
|---|---|---|
| DE | 102019103210 A1 | 8/2020 |
| FR | 2110770 A5 | 6/1972 |

OTHER PUBLICATIONS

International Search Report for International Application No. PCT/EP2022/076373 dated Jan. 23, 2023 (3 pages).

(Continued)

*Primary Examiner* — James M Hewitt, II
(74) *Attorney, Agent, or Firm* — REISING ETHINGTON, P.C.

(57) ABSTRACT

The disclosure relates to an insert piece for inserting into a channel section of an angled piece for fluidically connecting fluid lines. The insert piece has a mounting for placing on the channel section and at least one guide element for at least partly changing the flow direction of at least one part of a fluid flowing through the channel section by a change angle. The mounting has an opening, and the at least one guide element is arranged in the opening. The guide element extends between a first section of the mounting and a second section of the mounting and is secured to the mounting. The mounting has a recess between the first section and the second section.

12 Claims, 4 Drawing Sheets

(56)  References Cited

U.S. PATENT DOCUMENTS

| | | | | |
|---|---|---|---|---|
| 2,703,045 | A * | 3/1955 | Gilbert | G03B 21/16 |
| | | | | 454/251 |
| 2,705,973 | A * | 4/1955 | Kice | F15D 1/04 |
| | | | | 454/309 |
| 4,019,537 | A | 4/1977 | Bonnard et al. | |
| 12,140,167 | B2 * | 11/2024 | Kintea | F15D 1/04 |
| 2020/0116289 | A1 | 4/2020 | Cosley et al. | |
| 2022/0128072 | A1 | 4/2022 | Kintea et al. | |

OTHER PUBLICATIONS

Written Opinion for International Application No. PCT/EP2022/076373 dated Jan. 23, 2023 (5 pages).
English Translation of International Search Report for International Application No. PCT/EP2022/076373 dated Jan. 23, 2023 (2 pages).

* cited by examiner

INSERT PIECE FOR INSERTING INTO A CHANNEL SECTION OF AN ANGLED PIECE

The disclosure relates to insert pieces for inserting into a channel section of an angled piece.

In vehicles, fluids, such as for example oil, fuel or cooling water, are provided by way of fluid lines at different positions in the vehicle. These lines runs in different directions and in different installation spaces so that angled pieces are required at some positions in order to guide the fluid lines "around the corner". The angled pieces are configured as quick connectors for connecting fluid lines and for connecting two fluid lines at a specific angle, for example at 90°, to one another. These angled pieces can be manufactured, for example, by injection molding methods in which mold cores form the interior of the angled piece. After the injection-molded material has cured, the mold cores are withdrawn from the angled piece. Separate mold cores are used for each leg of the angled piece so that a sharp edge is produced between the legs of the angled piece. If a curve were to be molded instead of the edge, this would represent an undercut for the mold core which could lead to damage to the angled piece when withdrawing the mold core. If a fluid flows over this sharp edge during operation, vortices are produced by the sudden change in direction, which results in a significant pressure drop. This pressure drop has an effect on the entire fluid system of the vehicle in which this angled piece is installed.

In order to reduce this pressure drop, it is disclosed in DE 10 2019 103 210 A1 to arrange at least one guide element for changing the flow direction in the region of the edge of the angled piece. The guide element conducts the fluid flowing out of the one leg over the edge through the angled piece into the other leg. Thus fewer vortices are produced, so that the pressure drop is reduced.

SUMMARY

It is an object per an embodiment to provide a further improved insert piece which can be inserted in a simple manner into a channel section of an angled piece.

In an insert piece for inserting into a channel section of an angled piece for fluidically connecting fluid lines, wherein the insert piece has a mounting for placing on the channel section and at least one component, wherein the mounting has an opening and the at least one component is arranged in the opening and wherein the component extends between a first section of the mounting and a second section of the mounting and is secured to the mounting, it is provided according to embodiment that the mounting has a recess between the first section and the second section.

An insert piece which has a mounting with a recess is provided per an embodiment. The at least one component is arranged between the first section of the mounting and the second section of the mounting in an opening of the mounting. The at least one component is secured, in particular, to the first section and the second section. The securing can take place directly or indirectly on the first and second section. If the insert piece is arranged in a channel section of an angled piece, a fluid can flow through the opening from one leg of the angled piece into the other leg. The channel section can be configured so as to change a flow direction of a fluid by a change angle.

The mounting can be held in the angled piece, for example, positively by a type of tongue-and-groove connection or a latching connection or a non-positive connection. The mounting extends in the extension of the front face on the channel section. Due to the recess on the mounting, a section of the mounting which otherwise might be arranged between the guide element and the wall of the channel section is no longer necessary. Therefore, at this position the opening, in which the guide element is arranged, is enlarged by the recess. Thus a decrease in the flow cross section of the fluid between the mounting and the at least one component is reduced. Preferably, per an embodiment, the recess is arranged on the inner edge of the angled piece when the insert piece is arranged in the angled piece. By virtue of an embodiment, therefore, a further improved insert piece which produces a further reduced pressure drop is provided.

In an embodiment, the component is configured as a valve and/or measuring element. The valve and/or measuring element can be inserted without any great effort in the channel section and secured therein by the mounting. The mounting absorbs the deformations which occur, in particular, during insertion. The mechanical load on the valve and/or measuring element is thus kept low. The channel section or the angled piece can have the same or similar external dimensions as a conventional angled piece, so that a simple retrospective replacement is possible.

In an alternative embodiment, the component is configured as a guide element which at least partly changes a flow direction of at least one part of a fluid flowing through the channel section by a change angle. The channel section can be configured so as to change a flow direction of a fluid by a change angle. The at least one guide element extends between the first section of the mounting and the second section of the mounting and is arranged in an opening of the mounting. Thus at least one part of the fluid flowing through the opening is diverted or guided by the guide element from the one leg into the other leg. The occurrence of vortices is thus reduced and thus a loss of pressure kept small and minimized.

According to one example, the at least one guide element can have at least partially a curved surface for changing the flow direction, wherein the curved surface extends at least partially around the recess.

The fluid which flows through the channel section of the angled piece can thus be diverted by way of the curved surface. The guide element can be configured as a curved guide vane. A leg of the guide vane is preferably per an embodiment oriented counter to the incoming flow direction of the fluid. The other leg of the guide vane is preferably oriented in the desired outgoing flow direction of the fluid after passing the channel section. The flow cross section of the fluid on the curved surface is maximized by the recess.

It is conceivable that the mounting is configured, for example, in a C-shaped manner.

The mounting can be oriented with the opening of the C-shape toward the edge of the angled piece. The opening of the C-shape corresponds to the recess of the mounting. The remaining part of the mounting can be arranged between a front face of a fluid line to be coupled to the angled piece and a receiver on the channel section.

The insert piece can have, for example, at least one spring element which can absorb deformations or displacements, so that these deformations or displacements are not transmitted to the at least one component which is configured, in particular, as a guide element.

Therefore, in particular, deformations which occur when the insert piece is introduced into the angled piece can be compensated by the spring element relative to the at least one guide element. The angled piece can have, for example, a groove on the channel section for receiving the mounting. The mounting can be pushed through a leg of the angled piece as far as the groove. The mounting can be latched into the groove. The mounting is buried by the inner walls of the leg on the path to the groove, wherein the at least one spring element absorbs the compression and shields the at least one guide element therefrom. Thus it is possible to avoid damage to the at least one component or the guide element due to forces acting on the mounting.

Moreover, the at least one spring element can extend in a circumferential direction around the opening, for example at least partially along the mounting.

The at least one spring element can be provided, for example, by manufacturing or providing a slot, wherein the slot extends through the mounting in an axial direction relative to the opening. Moreover, the slot can extend in the circumferential direction around the opening along a part of the mounting. The external part of the mounting relative to the slot, and which is located radially relative to the opening, can thus act as a spring element. In this manner, a type of leaf spring can be provided on the mounting.

According to a further example, the at least one spring element can connect the at least one guide element to the first section and/or the second section.

The at least one spring element can act as a bearing for the at least one guide element. The at least one guide element is thus mounted resiliently relative to the mounting. A deformation of the mounting can be reduced by the resilient bearing of the at least one guide element.

Moreover, the at least one spring element can be configured, for example, as a resilient lever which extends between the at least one guide element and the first section and/or second section.

A resilient lever can resiliently bear the at least one guide element in a particularly effective manner at a distance from the mounting.

In a further example, the at least one guide element can have a support element, wherein the at least one guide element is connected via the support element to the at least one spring element.

Thus the at least one spring element can provide via the support element a resilient bearing for the at least one guide element on the mounting. If a plurality of guide elements are connected to the support element, a resilient bearing for all of the guide elements connected to the support element can be implemented thereby in an effective manner.

Moreover, the at least one spring element can be configured, for example, as a compression ring section which is arranged radially outwardly relative to the opening on the mounting.

The mounting can have, for example, a plurality of compression ring sections. Forces acting radially to the opening can be absorbed by the at least one spring element due to the compression ring sections, before a force is transmitted to the mounting and thus to the at least one guide element.

Moreover, the disclosure relates to an angled piece for fluidically connecting fluid lines, wherein the angled piece has a channel section for changing a flow direction of a fluid flowing through the angled piece by a change angle and an insert piece according to one of the preceding claims, wherein the insert piece is arranged in the channel section.

Advantages and effects, as well as developments, of the angled piece are found in the advantages and effects, as well as developments, of the above-described insert piece. Thus in this regard reference is made to the above description.

4

BRIEF DESCRIPTION OF THE FIGURES

Further features, details and advantages of the invention are found in the wording of the claims and in the following description of exemplary embodiments by way of the drawings, in which:

DETAILED DESCRIPTION

Figure 1:
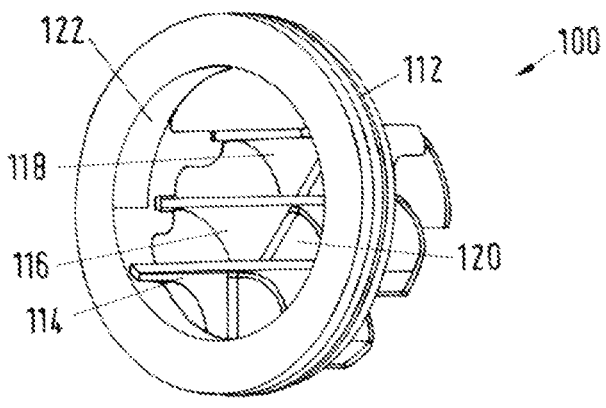
FIG. 1 shows a schematic view of an insert piece according to the prior art.

Firstly an insert piece 100 according to the prior art is shown in FIG. 1. The insert piece 100 has an annular mounting 112 with an opening 122. Three guide elements 114, 116, 118 are arranged in the region of the opening 122 such that a fluid flowing through the opening 122 comes into contact with the structural elements which are configured as guide elements 114, 116, 118. The guide elements 114, 116, 118 are connected to one another by a support element 120. The support element 120 is supported on the annular mounting 112.

Figure 2:
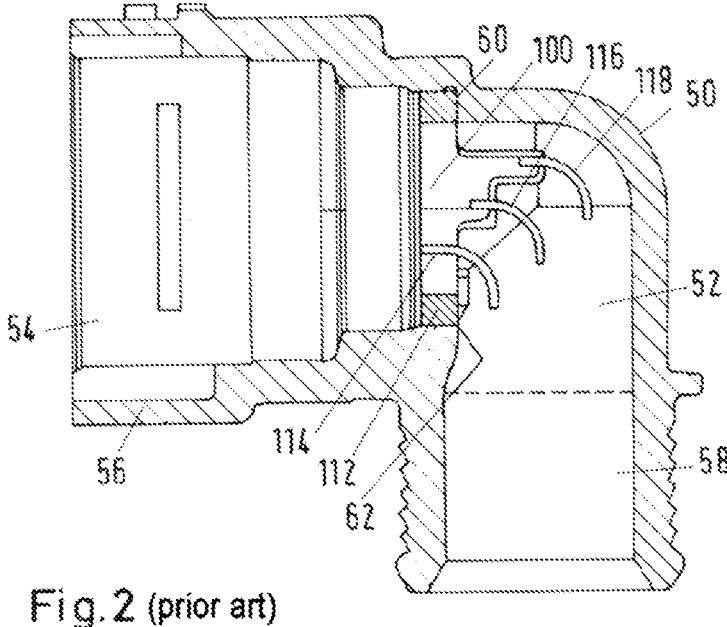
FIG. 2 shows a schematic view of an insert piece according to the prior art inserted into an angled piece.

According to FIG. 2, the insert piece 100 according to the prior art is shown in an angled piece 50 with a first leg 56 and a second leg 58. The insert piece 100 is arranged in a channel section 52 in the angled piece 50 in which a flow direction of a fluid flowing through the angled piece 50 is changed by a change angle. The angled piece 50 has a receiver 60 in which a first part of the annular mounting 112 is arranged. A second part of the annular mounting 112 is arranged between the guide element 114 and the edge 62 of the channel section 52. The flow cross section between the second part and the guide element 114 is smaller than the flow cross section between the guide elements 114, 116, 118. The edge 62 also narrows the section 52.

Figures 3, 4:
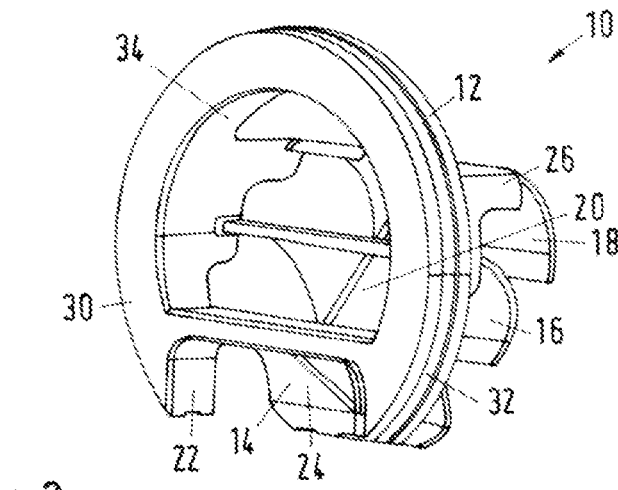
FIG. 3 shows a schematic view of an insert piece.
FIG. 4 shows a schematic view of an insert piece inserted into an angled piece.

FIG. 3 shows an insert piece 10 according to an embodiment. The insert piece 10 has a mounting 12, the guide elements 14, 16, 18 thereof being secured between a first section 30 of the mounting 12 and a second section 32 of the mounting 12.

The mounting 12 has a recess 22 between the first section 30 and the second section 32. The mounting 12 is configured in a C-shaped manner.

The guide element 14 further comprises a curved surface 24. The curved surface 24 is curved in a concave manner and is oriented toward the recess 22.

The further guide elements 16, 18 are connected via a support element 20 to the guide element 14. The support element 20 stabilizes the guide elements 14, 16, 18.

The further guide elements 16, 18 can also be connected directly to the mounting 12 via holding elements 26.

In FIG. 4 the insert piece 10 is arranged in the angled piece 50 according to FIG. 2. A part of the mounting 12 is also arranged between the front face of the end piece 54 of the fluid line and the receiver 60. The recess 22 is arranged on the edge 62. In comparison with FIG. 2 it can be seen that a larger flow cross section is available for the fluid at the position of the recess 22 between the guide element 14 and the edge 62 in FIG. 4.

An enlarged receiver is not required on the edge 62, therefore, in order to receive a section of the mounting 12. The dimensions of the angled piece 50, i.e. the length and height, do not have to be increased, therefore, in order to be able to provide a sufficient flow cross section for the fluid between the edge 62 and the guide element 14.

The part of the mounting 12 which is arranged in the receiver 60 can be flush with the inner wall of the channel section 52 and an inner wall of the end piece 54. Thus vortices can be reduced or entirely avoided on the receiver 60.

The external dimensions of angled pieces with the insert piece can coincide with those of conventional angled pieces, i.e. without the insert piece. This enables a simple replacement in existing configurations.

Figure 5:
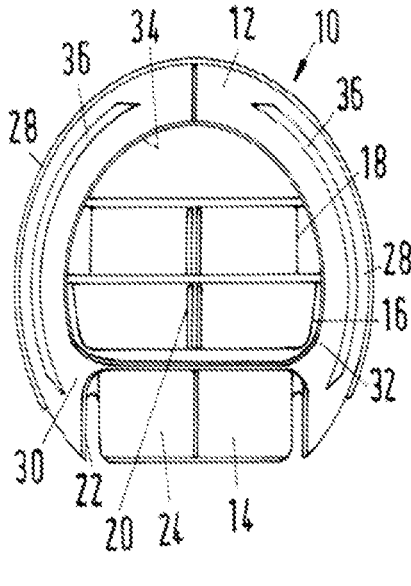
FIG. 5 shows a schematic view of an insert piece with a spring element.

Further exemplary embodiments of the insert piece 10 are shown according to FIGS. 5 to 6. In each of these exemplary embodiments the insert piece 10 has at least one spring element 28.

In the embodiment according to FIG. 5, the at least one spring element 28 is arranged externally on the mounting 12 radially away from the opening 34. The at least one spring element 28 extends in the circumferential direction around the opening 34. In this example, a slot 36 which extends in the circumferential direction is arranged between the at least one spring element 28 and the mounting 12. The spring element 28 of this example can be manufactured by producing the slot 36 from the material of the mounting 12 and can be integral with the mounting 12.

The spring element 28 acts in this example as a leaf spring when forces oriented from radially outside the opening 34 act on the mounting 12. The slot 36 can be reduced by these forces without the mounting 12 being substantially deformed.

In particular, a deformation and resulting damage to the guide elements 14, 16, 18 can be avoided thereby.

In this embodiment according to FIG. 5, the mounting 12 together with the spring elements 28 can be also understood as a slotted compression ring section.

Figure 6A:
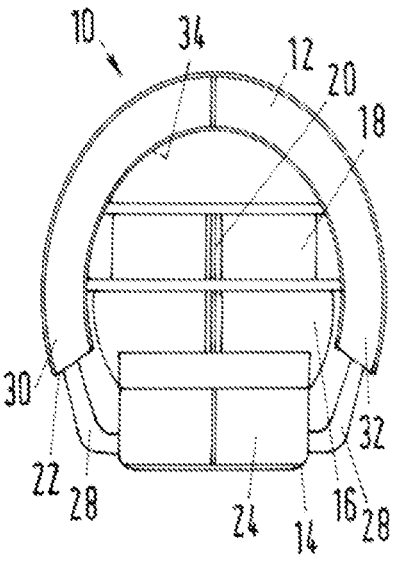
FIGS. 6a-c show a schematic view of an insert piece with a spring element in further exemplary embodiments.
Figure 6B:
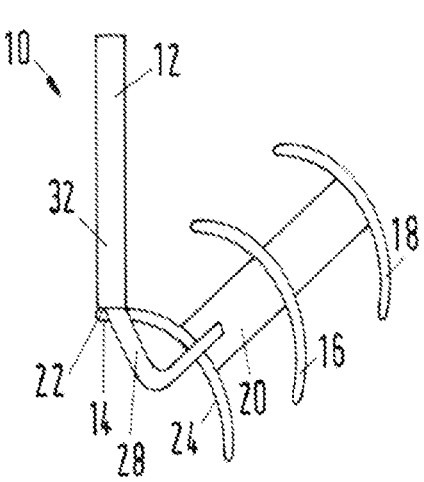

In the embodiment according to FIGS. 6a and 6b, the at least one spring element 28 is arranged between the at least one guide element 14, 16, 18. The at least one spring element 28 can be designed as a lever which connects the support element 20 to the mounting 12.

In the embodiment shown, two spring elements 28 are shown, wherein one of the spring elements 28 connects the support element 20 to the first section 30 and the other spring element 28 connects the support element 20 to the second section 32.

The guide elements 14, 16, 18 are not connected directly to the mounting 12. The securing of the guide elements 14, 16, 18 to the mounting 12 is implemented in this embodiment via the support element 20 and the spring elements 28. The guide elements 14, 16, 18 are secured in a resilient manner to the mounting 12 by way of the spring elements 28 which are configured as levers.

Figure 6C:
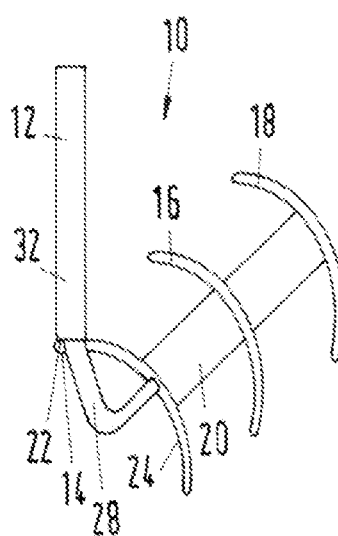

A further embodiment of the insert piece 10 is shown in FIG. 6c, in which the spring elements 28 which are configured as levers are secured directly to the guide element 14. Thus the guide element 14 is connected via the spring elements 28 to the first section 30 and to the second section 32 of the mounting 12.

The guide elements 16, 18 are thus connected to the mounting 12 via the support element 20, the guide element 14 and the spring elements 28.

The spring elements 28 which are configured as levers can be configured integrally with the remainder of the mounting 12 and/or the entire insert piece 10. To this end, a part of the mounting 12 can be designed to be thinner in order to increase the resilience to a sufficient extent that the spring elements 28 are produced.

Figure 7:
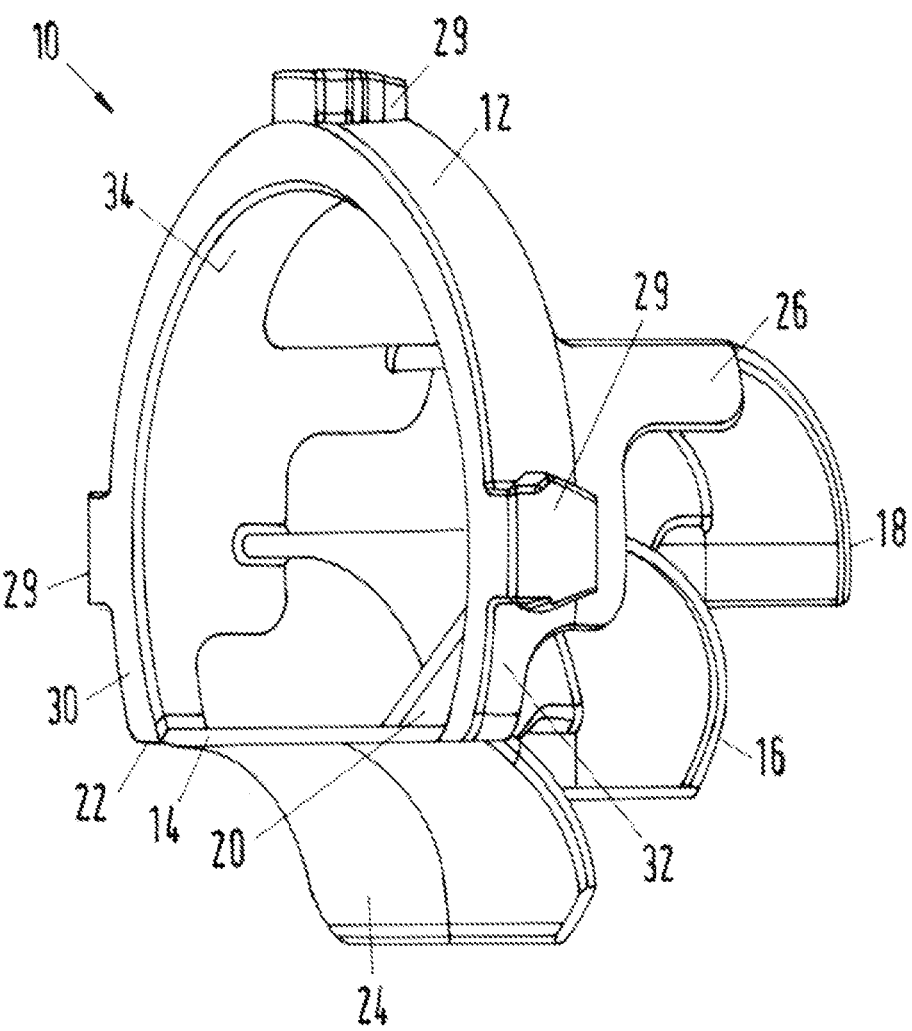
FIG. 7 shows a schematic view of an insert piece in a further exemplary embodiment.

In the embodiment according to FIG. 7, instead of spring elements 28, the mounting 12 has securing elements 29 facing radially outwardly on the surface.

The securing elements 29 can have undercuts which extend in the circumferential direction relative to the opening 34. The undercuts can also be configured tangentially relative to the outer surface of the mounting 12.

In the example according to FIG. 7, three securing elements 29 are provided on an outer circumference of the mounting 12, in each case the securing elements being secured to the mounting 12 offset by ca. 90°. However, any other number of securing elements can be secured to the mounting 12. The position of the securing elements on the mounting 12 can also be selected at will. These securing elements 29 can be introduced or latched in corresponding receivers in the angled piece, wherein in particular they are deformed in the circumferential direction. A deformation of the mounting is avoided thereby.

In all of the exemplary embodiments the insert piece can be configured integrally with the component or the components or guide elements. Furthermore, the insert piece can be manufactured from a material which does not undergo hydrolysis, such as for example polyphenylene sulfide (PPS).

The invention is not limited to one of the above-described embodiments but can be modified in a variety of ways. In particular, the embodiments of the guide elements can be transferred to different types of components which are designed to be secured by the mounting in a channel section.

All of the features and advantages, including structural details, spatial arrangements and method steps found in the claims, the description and the drawing can be essential to the invention both individually and in a wide variety of combinations.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Insert piece
12 Mounting
14 Guide element
16 Guide element
18 Guide element
20 Support element
22 Recess
24 Curved surface
26 Holding element
28 Spring element
29 Securing element
30 First section
32 Second section
34 Opening
36 Slot
50 Angled piece
52 Channel section
54 End piece
56 First leg
58 Second leg
60 Receiver
62 Edge
100 Insert piece
112 Mounting
114 Guide element
116 Guide element
118 Guide element
120 Support element
122 Opening

The invention claimed is:

1. An insert piece for inserting into a channel section of an angled piece for fluidically connecting fluid lines, wherein the insert piece has a mounting for placing on the channel section and at least one fluid flow component, wherein the mounting has an opening and the at least one fluid flow component is arranged in the opening and wherein the at least one component extends between a first section of the mounting and a second section of the mounting and is secured to the mounting, wherein the mounting has a recess between the first section and the second section, wherein the recess is formed and positioned on the mounting such that the recess is arranged on an inner angled edge of the angled piece when the insert piece is arranged in the angled piece, wherein the mounting extends in a circumferential direction around the opening of the mounting, and wherein the mounting is C-shaped and an opening of the C-shape corresponds to the recess of the mounting.

2. The insert piece as claimed in claim 1, wherein the at least one fluid flow component is a valve and/or measuring element.

3. The insert piece as claimed in claim 1, wherein the at least one fluid flow component is a guide element which at least partly changes a flow direction of at least one part of a fluid flowing through the channel section by a change angle.

4. The insert piece as claimed in claim 1, wherein the at least one fluid flow component has at least partially a curved surface for changing the flow direction, wherein the curved surface extends at least partially around the recess.

5. The insert piece as claimed in claim 1, wherein the insert piece has at least one spring element which effects weakening deformations acting radially to the opening on the at least one component.

6. The insert piece as claimed in claim 5, wherein the at least one spring element extends in a circumferential direction around the opening at least partially along the mounting.

7. The insert piece as claimed in claim 5, wherein the at least one spring element connects the at least one component to the first section and/or the second section.

8. The insert piece as claimed in claim 5, wherein the at least one spring element is a resilient lever which extends between the at least one component and the first section and/or second section.

9. The insert piece as claimed in claim 7, wherein the at least one fluid flow component is a guide element and has a support element, wherein the at least one guide element is connected via the support element to the at least one spring element.

10. The insert piece as claimed in claim 5, wherein at least one spring element is a compression ring section which is arranged radially outwardly relative to the opening on the mounting.

11. An angled piece for fluidically connecting fluid lines, wherein the angled piece has a channel section for changing a flow direction of a fluid flowing through the angled piece by a change angle and an insert piece as claimed in claim 1, wherein the insert piece is arranged in the channel section.

12. The insert piece as claimed in claim 1, wherein the recess provides an absence of the insert piece and an absence of the mounting at the inner angled edge of the of the angled piece when the insert piece is arranged in the angled piece.

* * * * *